United States Patent Office 3,378,451
Patented Apr. 16, 1968

3,378,451
NEUTRON IRRADIATION METHOD OF SYNTHESIZING ETHYLENE GLYCOL AND FORMALDEHYDE
Bernard H. Hamling, Warwick, N.Y., assignor to Union Carbide Corporation, a corporation of New York
No Drawing. Filed July 28, 1965, Ser. No. 475,586
1 Claim. (Cl. 176—39)

This invention relates to the use of nuclear fission in chemical synthesis. More particularly, the invention is directed to nuclear fuels which are stable in liquid solution and to a process for synthesizing organic compounds which employs such fuels.

The high energy fragments from fissioning atomic nuclei have been used heretofore in promoting chemical reactions, and in some instances intimate mixtures or unstable solutions of the fissioning atomic species in liquid organic reactants have been employed. However, where mixtures (slurries) or thin films of fissionable material have been used, the absorption of useful fission energy by the reactant organic compounds seldom exceeds 60–70 percent. Where compounds of the fissioning atomic species which have some solubility in the reactant organic compounds have been employed, for example, uranyl nitrate or sulfate, the fuel compounds are unstable and soon form insoluble precipitates, again reducing the absorption of useful fission energy by the reactant compounds.

It is an object of this invention to provide nuclear fuels and methods for using such fuels in organic synthesis which are not subject to the disadvantages discussed above. Another object of the invention is to provide nuclear fuels which form stable solutions in polar organic compounds. A still further object of the invention is to provide a process for producing organic compounds by means of nuclear fission energy in which the fission energy deposition in the polar organic reactants approaches 100 percent efficiency.

The nuclear fuels of this invention which form stable solutions in polar organic compounds includes, for example, $UCl_4$, $U(OR)_4$ where R is an alkyl, cycloalkyl, or aryl group, and $UCl_n(OR)_{4-n}$, where R is an alkyl, cycloalkyl or aryl group and $n$ is an integer having a value from 1 to 3 inclusive. R in the above formulas preferably contains from 1 to 6 carbon atoms and includes, for example, the methyl, isopropyl, hexyl, cyclopentyl and phenyl groups.

According to the process of this invention, one or more of the above-described fuels is dissolved in a polar organic compound (or mixture of two or more polar organic compounds) and the resulting solution subjected to a thermal neutron flux.

Suitable polar organic compounds include, for example, aldehydes, such as butyraldehyde, benzaldehyde and the like; ketones, such as acetone, methylpropylketone, acetophenone and the like; alcohols such as methanol, butanol, ethylene glycol, hexylene glycol, glycerol, and the like; carboxylic acids, such as acetic acid, butyric acid, malonic acid, and the like; amines such as methylamine, dibutylamine, triethylamine, hexamethylene diamine, aniline, and the like; amides, such as acetamide, benzamide and the like; esters such as ethylacetate, butylpropionate, methyl benzoate and the like; nitriles such as ethyl cyanide, butyl cyanide, benzyl cyanide and the like; and compounds containing aliphatic and/or aromatic unsaturation in addition to polar functional groups, such as styrene, benzyl alcohol, methylmethacrylate, crotonaldehyde, allylcyanide, and the like.

The $UCl_4$ for use in this invention can be conveniently prepared by photo-chemical reduction (mercury lamp) of a methanol solution of $UO_2Cl_2$ and hydrochloric acid.

The solutions of the nuclear fuels of this invention in polar organic compounds can be subjected to thermal neutron flux by known methods and the products (usually mixtures of several compounds) of the chemical reactions can be recovered from the reaction mixture by conventional techniques.

The amount of nuclear fuel compound employed in the process of this invention is not narrowly critical. For example, satisfactory results can be obtained where the solution contains as little as 4 grams of natural uranium per liter. Better results are obtained where uranium enriched with the U 235 isotope is employed. It is preferable to use a highly enriched fuel which provides at least 5 grams of U 235 per liter of solution.

Some chemical reaction of the nuclear fuel compound and the polar organic compounds takes place in certain instances. For example, $UCl_4$ dissolved in methanol reacts to form a mixture of $UCl_4$, $UCl_3(OCH_3)$, $UCl_2(OCH_3)_2$, $UCl(OCH_3)_3$ and $U(OCH_3)_4$.

When the polar organic compound contains oxygen, small amounts of water are sometimes formed as one of the radiation products. Water can in turn react with $UCl_4$, $UCl_n(OR)_{4-n}$, $U(OR)_4$ and the like to form insoluble hydrolysis products. The formation of insoluble products can be avoided by adding small amounts of acids, such as HCl, to the solutions prior to radiation.

In a typical example of the process of this invention, a methanol solution is prepared having a $UCl_4$ concentration of 0.02 mole of $UCl_4$ per liter. The methanol should be dried by passing through a column of molecular sieve zeolite. The uranium is natural enrichment (0.7% U 235 content). About 20 ml. of the methanol solution (containing 0.094 gm. U of which $6.6 \times 10^{-4}$ gms. is the U 235 isotope) is placed in a 100 ml. volume stainless steel container. The container is cylindrical, measuring 1-inch inside diameter by about 8 inches long, and welded closed at the bottom end. The solution is freed of dissolved oxygen by bubbling helium through it. The top of the container is closed with a compression-type fitting. The capsule is next placed in a secondary, water-filled container (for safety purposes) and exposed to a thermal neutron flux of $4.0 \times 10^{12}$ neutrons/cm.$^2$/sec. for a period of 100 hours in a 5 megawatt pool-type nuclear reactor. The temperature of the methanol solution during the irradiation is about 60–70° C. The temperature can be conveniently measured by a thermocouple located at the bottom of the inner capsule. During the irradiation period about $1.3 \times 10^{14}$ fissions occur depositing about $2.5 \times 10^{22}$ electron volts of ionizing radiation in the methanol.

After a period of two weeks from the time of removal from the reactor to allow for radioactive decay, the inner capsule is opened and the reaction mixture is separated and analyzed. The principal reaction products are ethylene glycol and formaldehyde.

In another typical example carried out following the same procedure, $U(OCH_3)_4$ is dissolved in acetaldehyde and the solution is subjected to thermal neutron flux. The principal products are 2,3-butane-dione and acetone.

What is claimed is:

1. The process which comprises dissolving uranium tetrachloride in methanol in an amount equivalent to at least 4 grams of uranium per liter of solution, and subjecting the solution to thermal neutron flux to produce at least ethylene glycol and formaldehyde.

References Cited

UNITED STATES PATENTS 3,065,159 11/1962 Conner et al.
3,228,848 1/1966 Fellows _____ 176—39

FOREIGN PATENTS 583,465 9/1959 Canada.

REUBEN EPSTEIN, *Primary Examiner.*